(12) United States Patent
Huang et al.

(10) Patent No.: US 8,644,124 B2
(45) Date of Patent: Feb. 4, 2014

(54) OPTICAL DEVICES INCLUDING ASSIST LAYERS

(71) Applicant: Seagate Technology LLC, Cupertino, CA (US)

(72) Inventors: Xiaoyue Huang, Eden Prairie, MN (US); Michael Christopher Kautzky, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/795,649

(22) Filed: Mar. 12, 2013

(65) Prior Publication Data

US 2013/0279313 A1    Oct. 24, 2013

Related U.S. Application Data

(60) Provisional application No. 61/637,434, filed on Apr. 24, 2012.

(51) Int. Cl.
*G11B 11/00* (2006.01)

(52) U.S. Cl.
USPC ............... 369/112.27; 369/13.33; 369/13.13

(58) Field of Classification Search
USPC .......... 369/13.33, 13.32, 13.24, 13.14, 13.03, 369/13.12, 13.22, 13.01, 112.27, 13.35, 369/44.12; 360/125.74, 125.4; 385/124, 385/144
See application file for complete search history.

(56) References Cited

U.S. PATENT DOCUMENTS

| | | | |
|---|---|---|---|
| 3,563,630 A | 2/1971 | Anderson | |
| 5,113,472 A | 5/1992 | Gualtieri | |
| 7,292,766 B2 | 11/2007 | Anderson | |
| 7,582,161 B2 | 9/2009 | Ahn | |
| 8,023,225 B2 | 9/2011 | Shimazawa | |
| 8,149,657 B2 * | 4/2012 | Huang et al. | 369/44.12 |
| 8,400,902 B2 * | 3/2013 | Huang et al. | 369/112.27 |
| 8,451,555 B2 * | 5/2013 | Seigler et al. | 360/59 |
| 8,509,037 B1 * | 8/2013 | Huang et al. | 369/13.24 |
| 2009/0052076 A1 | 2/2009 | Shimazawa | |
| 2010/0214685 A1 | 8/2010 | Seigler | |

OTHER PUBLICATIONS

W.Y. Ching et al., "Electronic and Optical Properties of Y2SiO5 and Y2Si2O7 With Comparisons to α-SiO2 and Y2O3", Physical Review B 67 (2003), pp. 245108-1-245108-8.

* cited by examiner

*Primary Examiner* — Ali Neyzari
(74) *Attorney, Agent, or Firm* — Mueting Raasch & Gebhardt PA (57) ABSTRACT

A waveguide including a first cladding layer, the first cladding layer having an index of refraction, $n_3$; an assist layer, the assist layer having an index of refraction, $n_2$, and the assist layer including $ASi_xO_y$, wherein A is selected from: Ta, Ti, Nb, Hf, Zr, and Y, x is from about 0.5 to about 2.0, y is from about 3.5 to about 6.5, and the atomic ratio of A/A+Si in $ASi_xO_y$ is from about 0.2 to about 0.7; and a core layer, the core layer including a material having an index of refraction, $n_1$, wherein $n_1$ is greater than $n_2$ and $n_3$, and $n_2$ is greater than $n_3$.

20 Claims, 6 Drawing Sheets

OPTICAL DEVICES INCLUDING ASSIST LAYERS

PRIORITY

This application claims priority to U.S. Provisional Application No. 61/637,434 entitled "OPTICAL WAVEGUIDE HAVING REFRACTIVE INDEX TUNABLE MATERIALS" filed on Apr. 24, 2012, the disclosure of which is incorporated herein by reference thereto.

BACKGROUND

In thermally assisted magnetic/optical recording, information bits are recorded to a storage layer of a storage media at elevated temperatures. Generally, a spot or bit on the storage medium is heated to reduce its coercivity sufficiently so that an applied magnetic field or optical write signal can record data to the storage medium. Current methods of heating the storage media include directing and focusing energy onto the storage media. Different and more advantageous methods and devices for focusing the energy are needed in order to decrease the size of the heated spot in order to increase the storage density of the storage media.

SUMMARY

A waveguide including a first cladding layer, the first cladding layer having an index of refraction, $n_3$; an assist layer, the assist layer having an index of refraction, $n_2$, and the assist layer including $ASi_xO_y$, wherein A is selected from: Ta, Ti, Nb, Hf, Zr, and Y, x is from about 0.5 to about 2.0, y is from about 3.5 to about 6.5, and the atomic ratio of A/A+Si in $ASi_xO_y$ is from about 0.2 to about 0.7; and a core layer, the core layer including a material having an index of refraction, $n_1$, wherein $n_1$ is greater than $n_2$ and $n_3$, and $n_2$ is greater than $n_3$.

A device including a light source; and a waveguide, the waveguide including: a first cladding layer, the first cladding layer including a material having an index of refraction, $n_3$; an assist layer, the assist layer including a material having an index of refraction, $n_2$, and the assist layer including $ASi_xO_y$, wherein A is selected from: Ta, Ti, Nb, Hf, Zr, and Y, x is from about 0.5 to about 2.0, y is from about 3.5 to about 6.5, and the atomic ratio of A/A+Si in $ASi_xO_y$ is from about 0.2 to about 0.7; and a core layer, the core layer including a material having an index of refraction, $n_1$, wherein $n_1$ is greater than $n_2$ and $n_3$, and $n_2$ is greater than $n_3$, and wherein the light source and the waveguide are configured so that light from the light source is directed into the waveguide.

A disc drive comprising at least one actuator arm having a flexure; at least one head, wherein each flexure has a head at the distal end thereof and wherein each head includes a light source; and a waveguide, the waveguide including: a first cladding layer, the first cladding layer including a material having an index of refraction, $n_3$; an assist layer, the assist layer including a material having an index of refraction, $n_2$, and the assist layer including $ASi_xO_y$, wherein A is selected from: Ta, Ti, Nb, Hf, Zr, and Y, x is from about 0.5 to about 2.0, y is from about 3.5 to about 6.5, and the atomic ratio of A/A+Si in $ASi_xO_y$ is from about 0.2 to about 0.7; and a core layer, the core layer including a material having an index of refraction, $n_1$, wherein $n_1$ is greater than $n_2$ and $n_3$, and $n_2$ is greater than $n_3$; a magnetic reader; and a magnetic writer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Disclosed devices can offer the advantage of providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, thermally or heat assisted magnetic recording (HAMR) heads, or disc drives that include such devices.

Figure 1:
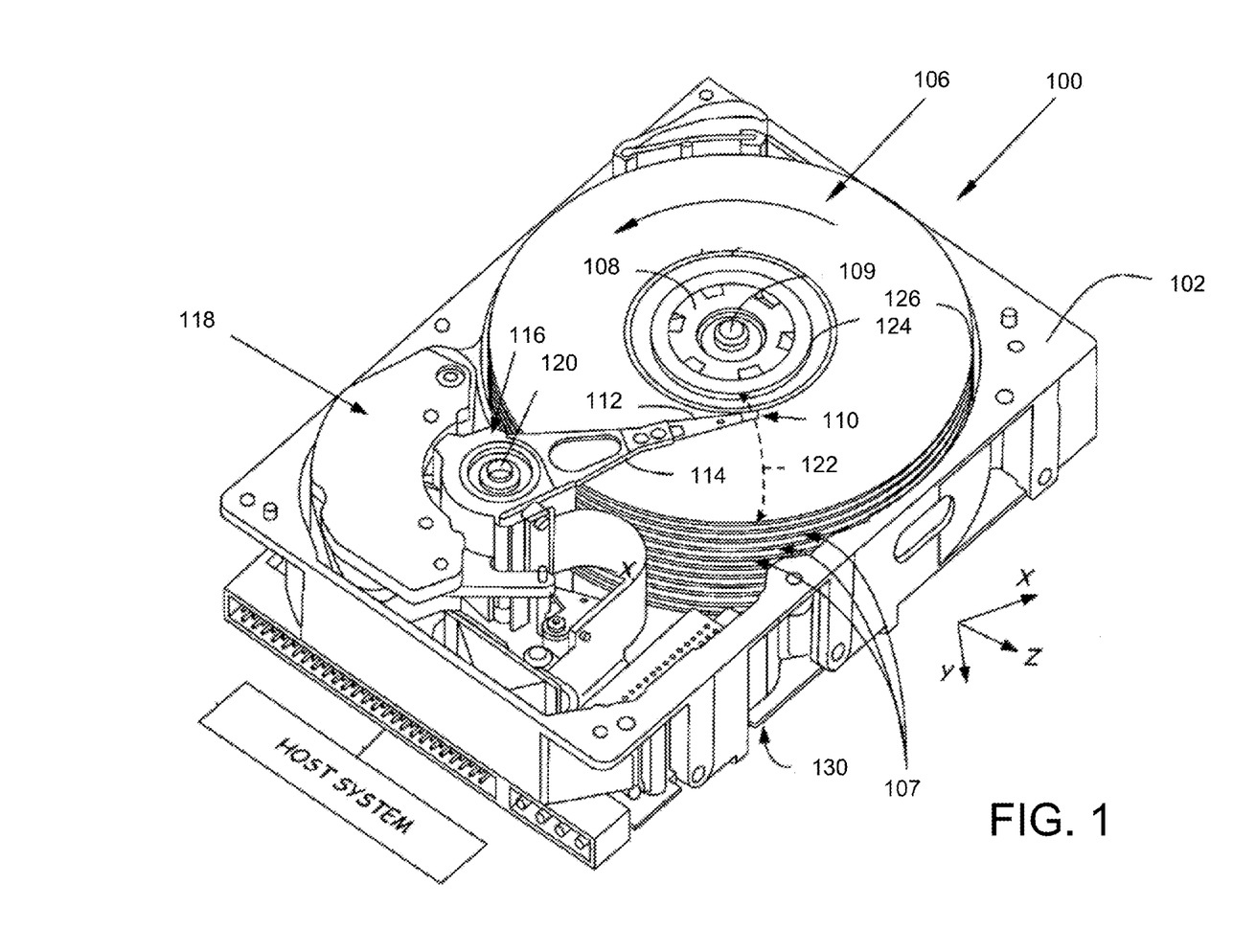
FIG. 1 is an isometric view of a system including a disc drive.

FIG. 1 is an isometric view of a disc drive 100 in which disclosed devices such as disclosed optical devices may be useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In general, the disc head slider 110 supports a recording head that can include disclosed optical devices. Disclosed optical devices included in the disc head slider 110 can be utilized to direct focused energy onto a surface of a disc 107 of the disc pack 106 to provide heat-assisted recording. A control circuit included with the servo electronics 130 or co-located with the servo electronics 130 along a bottom portion of the disc drive 100 may be used to control a position of the slider 110 and the associated read/write head relative to one of the individual discs 107 of the disc pack 106.

Figure 2:
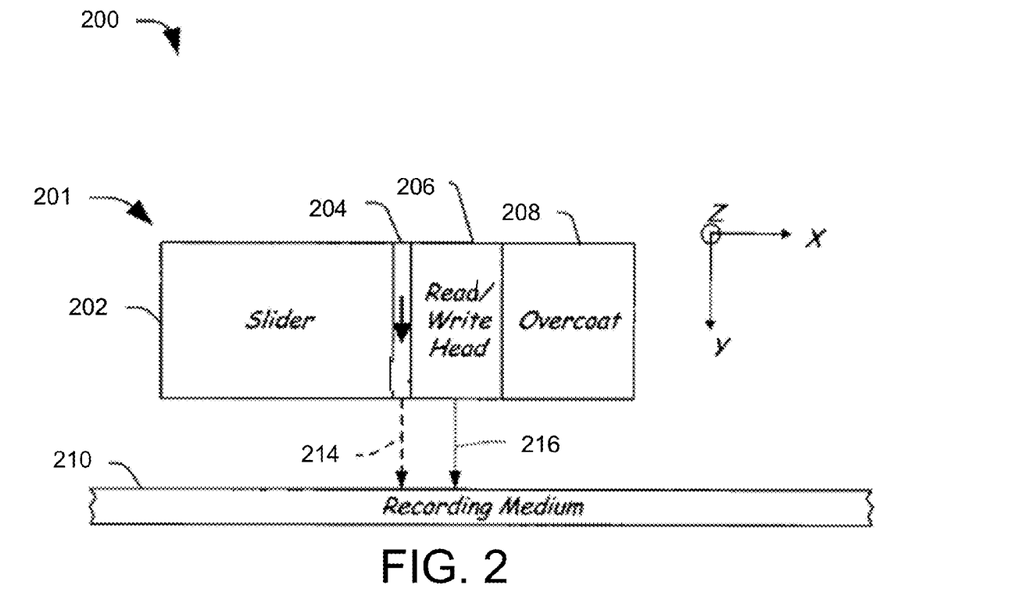
FIG. 2 is a block diagram of a particular illustrative embodiment of a recording head including a waveguide in communication with an illustrative recording medium.

FIG. 2 is a block diagram of a particular illustrative embodiment of a system 200 including a recording head 201 having an optical device 204 such as those depicted herein. The system 200 includes a recording medium 210 located perpendicular to a Y-axis of the optical device 204. The recording head 201 includes an air-bearing slider 202 that flies over the surface of the recording medium 210 and that is adapted to be adjusted in the X-direction and the Z-direction and that maintains a fly-height over the surface of the recording medium 210 in the Y-direction based on airflow. The air-bearing slider 202 is coupled to a read/write head 206, which is adjacent to the optical device 204. The optical device 204 focuses evanescent waves energy toward the surface of the recording medium 210. The recording head 201 can optionally include overcoat layer 208 that functions to protect the read/write head 206.

In a particular embodiment, the optical device directs focused energy 214 onto the surface of the recording medium 210 to heat a local area of the recording medium 210 to reduce a coercivity of the local area. Concurrently, the read/write head 206 directs a recording field 216 onto the recording medium 210 in the heated local area to record data to the recording medium.

Figure 3:
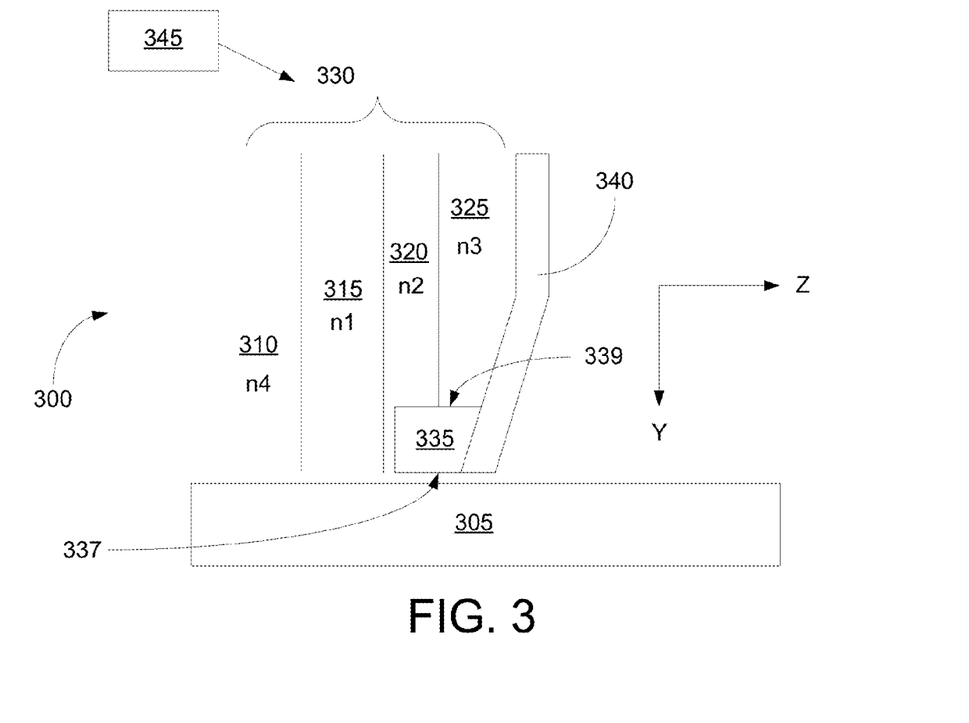
FIG. 3 is a partial cross section of a disclosed device.

FIG. 3 shows a device 300. The device 300 can generally include a waveguide, or an optical waveguide 330. The waveguide 300 can include a first cladding layer 325, an assist layer 320, and a core layer or structure 315. The assist layer 320 can generally be positioned adjacent the core layer 315 and adjacent the first cladding layer 315. Stated another way, the assist layer 320 can be positioned between the core layer 315 and the first cladding layer 325; the core layer 315 can be positioned adjacent the assistant layer 320. Generally, the waveguide 330 can also be described as a multilayer structure that includes the core layer 315, the assist layer 320 and the first cladding layer 325.

Waveguides may also optionally include a second cladding layer 310. The waveguide 330 in FIG. 3 shows an optional second cladding layer 310. The second cladding layer 310, if present can be adjacent the core layer 315 on the opposite side as the assist layer 320. In such embodiments, the core layer 315 can also be described as being positioned between the assist layer 320 and the second cladding layer 320.

The first cladding layer 325 generally includes or can be made of a material that has an index of refraction, n3. The assist layer 320 generally includes or can be made of a material that has an index of refraction, n2. The core layer 315 generally includes or can be made of a material that has an index of refraction, n1. In some embodiments, the core layer 315 can itself be a multilayer structure. A second cladding layer 310 can include or be made of a material having an index of refraction, n4.

Generally, the relationship of the indices of refraction of the various layers can be described in more detail. Generally, n1 is not less than, and in some embodiments greater than n2, n3, and n4. Generally, n2 is not less than, and in some embodiments greater than both n3 and n4. The core layer 315 can also be described as a high index layer; the assist layer 320 can also be described as a middle index layer; and the first cladding layer 325 and second cladding layer 310 can also be described as low index layers. In some embodiments, the material of the core layer 315 may have a refractive index (n1) from 1.9 to 4.0. In some embodiments, the material of the assist layer 320 may have a refraction index (n2) from 1.4 to 2.1. In some embodiments, the material of the assist layer 320 may have a refraction index (n2) from 1.4 to 1.9.

The material of the core layer 315 may have a refractive index greater than the material of either or all of the assist layer 320, the first cladding layer 325, and the second cladding layer 310. This enables the core layer 315 to more efficiently transmit the light energy or electromagnetic wave for heating the recording medium. In some embodiments, the material of the core layer 315 may have a refractive index (n1) from 1.9 to 4.0. In contrast, the material of the either or all of the assist layer 320, the first cladding layer 325, and the second cladding layer 310 may have a refractive index of less than 1.9. By forming the core layer 315 with a higher refractive index than the cladding layers, the core layer 315 is able to more efficiently guide a propagating or guided electromagnetic planar waveguide mode by total internal reflection. In some embodiments, by increasing the ratio of the core layer 315 refractive index to the cladding layers' refractive index (for the refractive index ranges stated herein), the energy of the propagating or guided mode can be more greatly confined within the core layer 315. As used herein, the term propagating or guided electromagnetic planar waveguide mode generally refers to optical modes which are presented as a solution of the eigenvalue equation, which is derived from Maxwell's equations subject to the boundary conditions generally imposed by the waveguide geometry.

In some embodiments, the first cladding layer 325 may be formed of a material such as, for example $SiO_2$, $MgF_2$, $Al_2O_3$, porous silica, or combinations thereof. The top and bottom cladding layers can be the same or different materials. In some embodiments, the second cladding layer 310 may be formed of a material such as, for example $SiO_2$, $MgF_2$, $Al_2O_3$, porous silica, or combinations thereof. In some embodiments, the second cladding layer 310 can be formed of a material that has advantageous properties, for example, the material can have advantageous corrosion resistant properties. Corrosion resistance can be important because the second cladding layer 310 is exposed to the air bearing surface (ABS) of the device. In some embodiments, the bottom cladding layer can be made of $SiO_2$, for example.

In some embodiments, the core layer 315 may be formed of a material such as, for example, $Ta_2O_5$, $TiO_x$, ZnSe, ZnS, Si, SiN, GaP, GaN, diamond, or combinations thereof. In some embodiments, the core layer 315 may be formed of a material such as, for example $Ta_2O_5$, $SiN_x$, $TiO_x$, diamond, or combinations thereof. In some embodiments, discussed below, the core layer 315 can be made of a multilayer structure.

The assist layer 320 which can also be described as a middle index layer can be made of various materials. In some embodiments, the assist layer 320 may be formed of $ASi_xO_y$. In $ASi_xO_y$, the atomic ratio of A/A+Si is from 0.2 to 0.7. In some embodiments, the atomic ratio of A/A+Si is from 0.25 to 0.65. In some embodiments, the atomic ratio of A/A+Si is from 0.25 to 0.5. A in $ASi_xO_y$ can be selected from Ta, Ti, Nb, Hf, Zr, and Y. In some embodiments, A in $ASi_xO_y$ can be selected from Ta, Ti, and Nb. In some embodiments, A in $ASi_xO_y$ can be Ta. In some embodiments, x in $ASi_xO_y$ is at least 0.5 (or greater than 0.5). In some embodiments, x in $ASi_xO_y$ is from 0.5 to 2.0. In some embodiments, y is $ASi_xO_y$ is at least 3.5 (or greater than 3.5). In some embodiments, y in $ASi_xO_y$ is from 3.5 to 6.5.

The optical waveguide 330 can be positioned adjacent other structures, and in embodiments can be configured to work in connection with other structures or devices. The embodiment of the optical waveguide 330 depicted in FIG. 3 is configured adjacent a magnetic pole 340, and a near field transducer-heat sink (NFT-HS).

In some embodiments, the core layer 315 may have a thickness, in the z direction (see FIG. 3), of 20 nm to 500 nm. The second cladding layer 310 may have a thickness in the z direction, of 200 nm to 2000 nm. The second cladding layer 310 should be sufficiently thick such that the electric field from the propagating waveguide mode does not extend appreciably beyond the second cladding layer 310 and thereby interact with any materials or structure outside of the waveguide 330. In some embodiments, increasing the ratio of the core layer 315 thickness to the second cladding layer 310 thickness (for the thickness ranges stated herein), the energy of the propagating mode can be more greatly confined within the core layer 315.

In some embodiments, the thickness of the assist layer 320 can be dependent on other structures positioned adjacent the assist layer, adjacent the waveguide 330, or a combination thereof. In some embodiments, the assist layer 320 can have a thickness from 10 nm to 100 nm. In some embodiments, the assist layer 320 can have a thickness from 30 nm to 50 nm. The thickness of the first cladding layer 325 can be dependent on other structures positioned adjacent the assist layer, adjacent the waveguide 330, or a combination thereof. In some embodiments, the first cladding layer 325 can have a thickness that is at least 400 nm (or greater than 400 nm). In some embodiments, the first cladding layer 325 can have a thickness that is from 500 nm to 800 nm.

The device 300 depicted in FIG. 3 includes not only an optical waveguide 330, but also a near field transducer-heat sink (referred to herein as NFT-HS) 335 and a magnetic pole 340. The NFT-HS can be a single structure that functions as both a near field transducer and a heat sink or it can be a multi-part structure which as a whole functions as a near field transducer and a heat sink. In some embodiments, the NFT-HS can be a peg/disc type of NFT, which can also be referred to as a lollipop structure, a gap type of NFT, or a funnel-type NFT for example. The near field transducer function of the NFT-HS functions to condense incoming light rays to a location on the magnetic media disc 305, while the heat sink function of the NFT-HS functions to funnel heat, which is generated by the NFT function, away from the NFT structure. The NFT-HS 335 can be described as having an air bearing surface 337. The air bearing surface 337 is adjacent the magnetic media disc 305. The NFT-HS 335 also has a back surface 339, which is the opposite or opposing surface as the air bearing surface 337. The magnetic pole 340 can generally function as a write pole in a read-write head. Although the examples discussed herein depict perpendicular magnetic recording heads, it will be appreciated that the embodiments depicted herein may also be used in conjunction with other types of recording heads and/or storage media where it may be useful to employ heat assisted magnetic recording.

The location of some of the components of the waveguide 330 can be further described with respect to the location of the NFT-HS 335 and the magnetic pole 340. The position of the first cladding layer 325 can be described as being positioned adjacent the back surface 339 of the NFT-HS 335. The positioned of the first cladding layer 325 can also be described as being positioned adjacent the magnetic pole 340. In some embodiments, the first cladding layer 325 can extend beyond (in the z direction) the magnetic pole 340. In some embodiments, the first cladding layer 325 can at least fill a region defined by the assist layer 320, the back surface 330 of the NFT-HS 335 and the magnetic pole 340. In such embodiments, the thickness of the first cladding layer 325 would therefore be defined, or limited by the structures surrounding it. The position of the assist layer 320 can also be further described with respect to the location of the NFT-HS 335. The position of the assist layer 320 can be described as being positioned adjacent the back surface 330 of the NFT-HS 335.

The thickness of the assist layer 320 and the first cladding layer 325 can also be described with respect to adjacent structures. For example, if the NFT-HS is described as having a height (in the z direction, or stated another way, parallel to the ABS), the thickness of the assist layer 320 (in the z direction) can be described with respect to the height of the NFT-HS. In some embodiments, the assist layer 320 has a thickness that is not greater than half the height of the NFT-HS. In some embodiments, the assist layer 320 can have a thickness that is less than half the height of the NFT-HS. In some embodiments, a NFT-HS can have a height of 200 nm. In such embodiments, the assist layer 320 can have a thickness of not greater than 100 nm. In some embodiments, the assist layer 320 can have a thickness from 20 nm to 80 nm.

The device depicted in FIG. 3 also includes a light source 345. The light source 345 is configured to generate light, which is directed into the optical waveguide 330. More specifically, the light source 345 and optical waveguide 330 are configured so that light from the light source is received by the waveguide and directed out the waveguide into the NFT-HS. Other devices and structures not depicted herein could be utilized to direct the light from the light source 345 into the optical waveguide 330. Exemplary types of structures or devices can include, for example, solid immersion mirrors including parabolic mirrors for example, mode index lenses, and three-dimensional channel waveguides. Exemplary types of light sources can include, for example laser diodes, light emitting diodes (LEDs), edge emitting laser diodes (EELs), vertical cavity surface emitting lasers (VCSELs), and surface emitting diodes.

The inclusion of the assist layer in disclosed optical waveguides can function to provide enhanced coupling tolerance between the light source and the core layer of the waveguide. The materials of disclosed assist layers can be advantageous because they may be able to withstand difficult environments such as hydrothermal high pressure (HTHP) environments that may be present at the ABS of HAMR heads. Previously utilized materials for middle index layers were not able to stand up to such environments. Furthermore, previously utilized materials showed increasing optical loss in the near infrared range as well as increasing optical loss with increased index of refraction.

Figure 4:
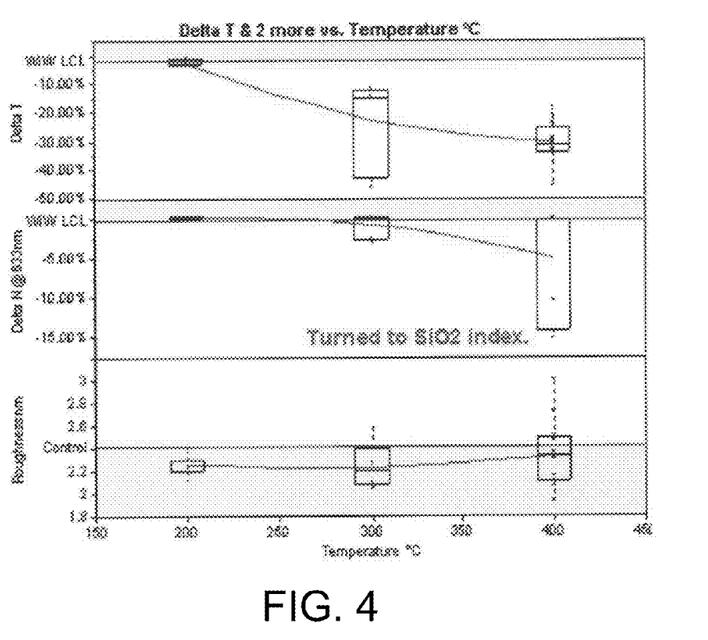
FIG. 4 shows results of high temperature high pressure (HTHP) testing on $SiO_xN_y$.
Figure 5A:
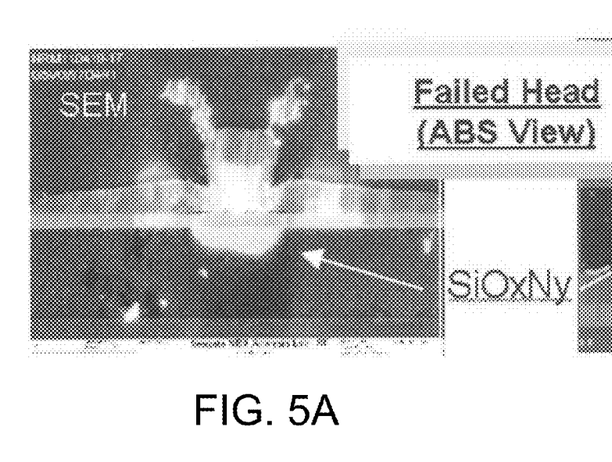
FIGS. 5A and 5B show scanning electron microscope (SEM) (FIG. 5A) and atomic force microscope (AFM) (FIG. 5B) images of HAMR heads after testing.
Figure 5B:
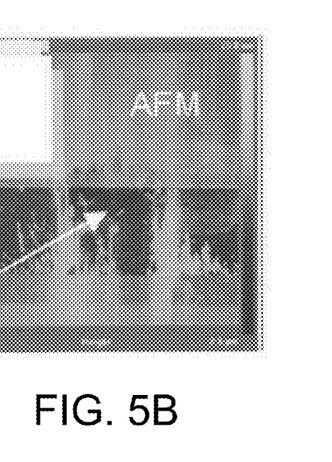
Figure 6:
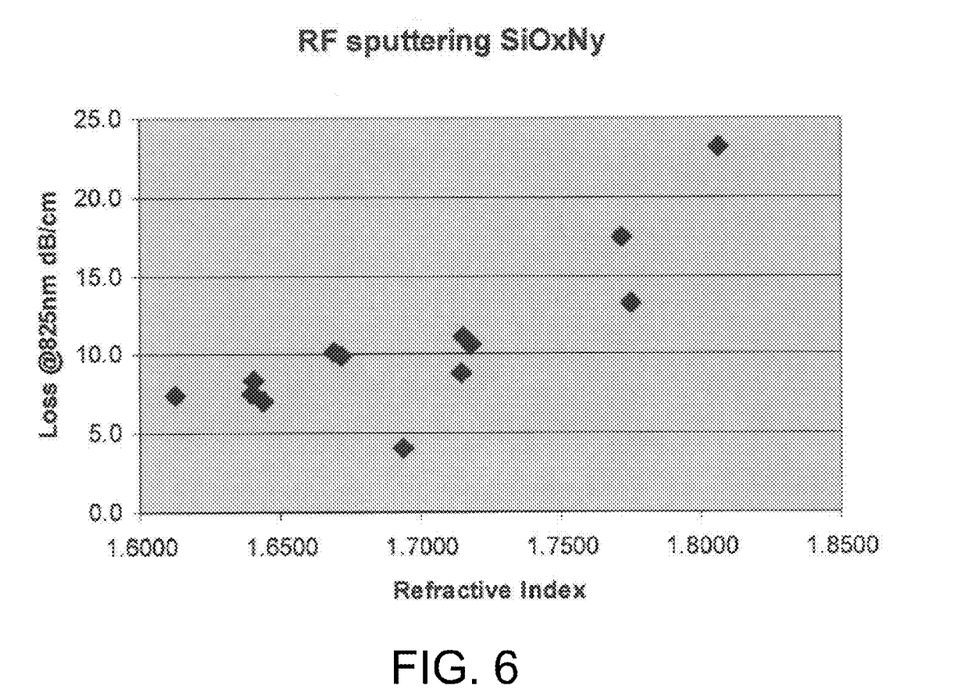
FIG. 6 shows optical loss at 825 nm as a function of the refractive index for $SiO_xN_y$.

Previously utilized middle index layers utilized $SiO_xN_y$. FIG. 4 shows HTHP testing on $SiO_xN_y$. As seen there, film thickness and index both drop significantly with increasing temperature in HTHP testing. FIGS. 5A and 5B show scanning electron microscope (SEM) (FIG. 5A) and atomic force microscope (AFM) (FIG. 5B) images of HAMR heads after testing. As seen there, the heads showed signatures of material degradation in the region of the $SiO_xN_y$. FIG. 6 shows optical loss at 825 nm as a function of the refractive index for $SiO_xN_y$. Other methods of forming $SiO_xN_y$, plasma enhanced chemical vapor deposition (PECVD), for example, render optical loss a smaller concern, but film composition and mechanical instabilities due to hydrogen content often require high temperature processes or post annealing processes. Furthermore, regular data storage thermal limits (<225° C.) don't allow for the stabilization requirement (400° C.).

Disclosed materials for the assist layer do not suffer from such drawbacks. The disclosed materials are generally fully oxidized and very stable with a constant low near infrared optical loss. Various fabrication methods can be utilized to form disclosed materials for the assist layer. In some embodiments, reactive sputtering can be utilized. In some embodiments where $TaSi_xO_y$ is to be formed, reactive sputtering with a $TaSi_x$ target, $O_2$ and Ar gases in a 1PVD system can be utilized. When $O_2$ is overflowed into the sputtering chamber, the $TaSi_x$ target is sputtered at poison mode. The deposition rate can be achieved at 2A/KJ in such a configuration. Such a process could be easily scaled up.

The present disclosure is illustrated by the following examples. It is to be understood that the particular examples, assumptions, modeling, and procedures are to be interpreted broadly in accordance with the scope and spirit of the invention as set forth herein.

EXAMPLES

Figure 7:
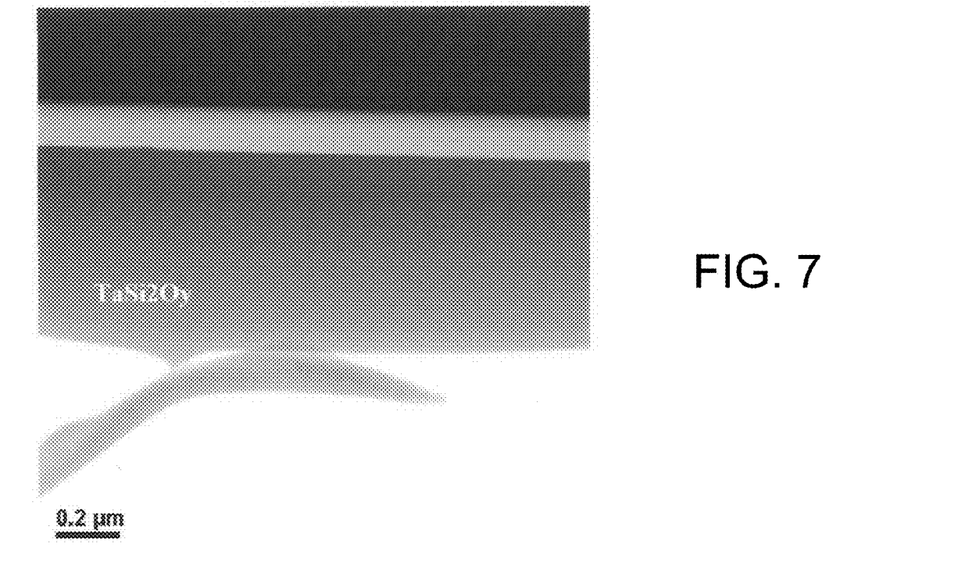
FIG. 7 shows a transmission electron microscope (TEM) image of a $TaSi_2O_y$ film.

A $TaSi_2O_y$ film was made using reactive sputtering with a $TaSi_x$ target, $O_2$ and Ar gases in a 1PVD system. The $O_2$ was overflowed into the sputtering chamber so that the $TaSi_x$ target was sputtered at poison mode. The processing conditions were as follows: 5-50 sccm $O_2$ and 20-100 sccm Ar; 2-10 mT process pressure with 500-10000 W cathode power. FIG. 7 shows a transmission electron microscope (TEM) image of the $TaSi_2O_y$ film. Table 1 provides some properties of the film.

TABLE 1

| Properties | $TaSi_2O_y$ |
|---|---|
| Nominal thickness (nm) | 700 |
| Temperature (° C.) | 176 |
| Micro-structure | Amorphous |
| Refractive index | 1.69 |
| Optical loss (dB/cm) | 1.0 |
| Stress (MPa) | −115 |
| Roughness (nm) | 1.0 |
| Breakdown Voltage (MV/cm) | 13.7 |
| Elastic Modulus (GPa) | 90 |
| Hardness (GPa) | 6.2 |
| C.T.E. (ppm/K) | 2.4 |
| Thermal Conductivity (W/m/K) | 0.6-0.7 |
| Stress Relieving - 400° C. cycles (Mpa) | +100 |
| Deposition Rate (Å/s) | 4.5 |

Figure 8A:
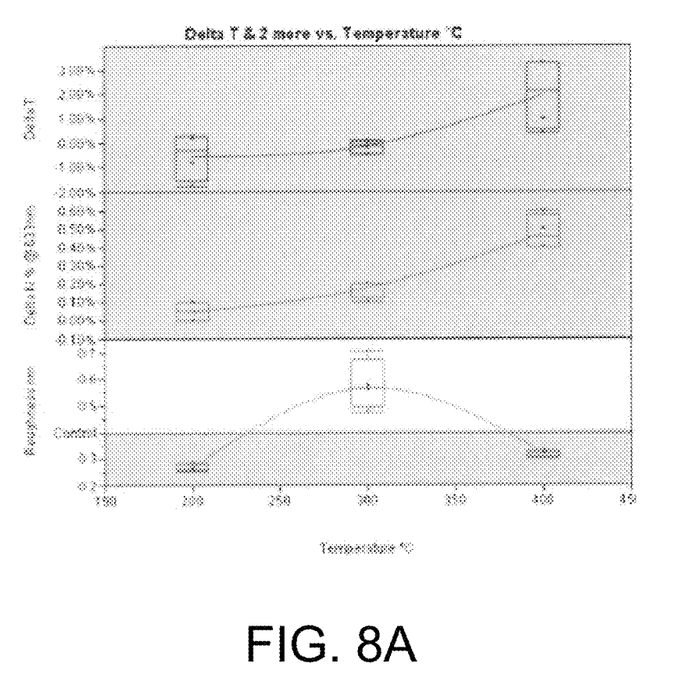
FIGS. 8A and 8B show the thickness change, refractive index change and roughness change as a function of temperature for HTHP testing of $TaSi_2O_y$ films.
Figure 8B:
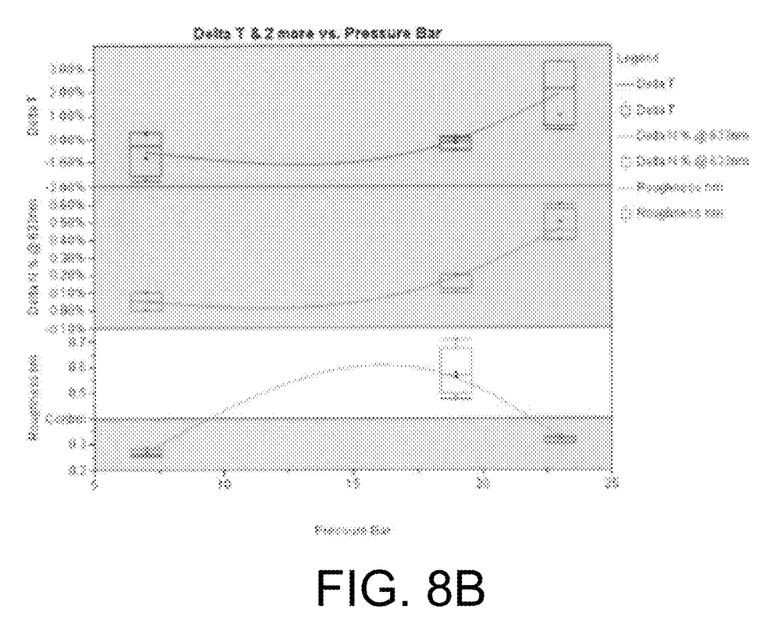

The $TaSi_2O_y$ film so formed was then subjected to HTHP testing. FIGS. 8A and 8B show the thickness change, refractive index change and roughness change as a function of temperature for the HTHP testing. As seen in FIGS. 8A and 8B, there were insignificant thickness, refractive index, and roughness changes up to 400° C./24 bar/100% humidity. The $TaSi_2O_y$ films also showed good waveguiding after being subjected to the HTHP testing.

Figure 9:
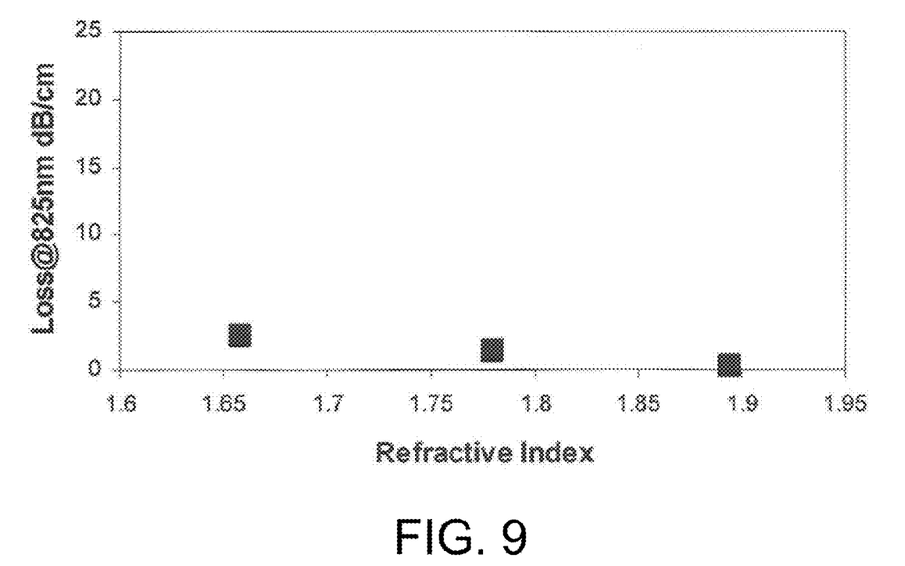
FIG. 9 shows the optical loss at 825 nm as a function of refractive index for the reactive sputtered $TaSi_xO_y$.

FIG. 9 shows the optical loss at 825 nm as a function of refractive index for the reactive sputtered $TaSi_xO_y$. As seen there, the optical loss is acceptably low across the entire refractive index range tested.

Figure 10:
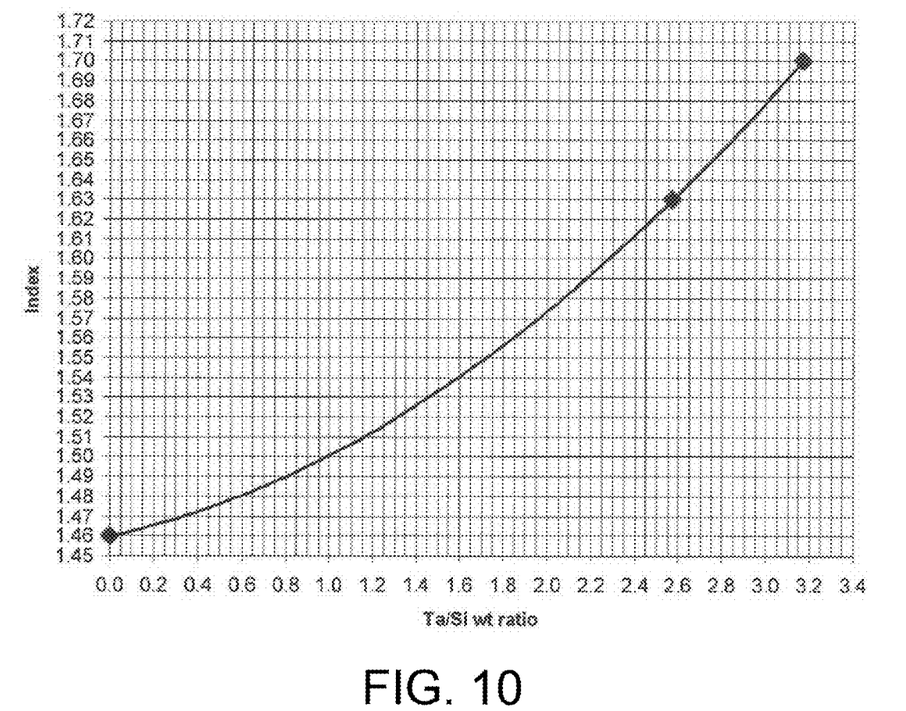
FIG. 10 shows the refractive index as a function of the weight ratio of Ta/Si in the $TaSi_xO_y$.

FIG. 10 shows the refractive index as a function of the weight ratio of Ta/Si in the $TaSi_xO_y$. As seen there, the refractive index of the material is tunable by changing the weight ratio of Ta/Si.

Thus, embodiments of optical devices including assist layers are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A waveguide comprising:
    a first cladding layer, the first cladding layer having an index of refraction, $n_3$;
    an assist layer, the assist layer having an index of refraction, $n_2$, and
        the assist layer comprising $ASi_xO_y$,
            wherein A is selected from: Ta, Ti, Nb, Hf, Zr, and Y,
            x is from about 0.5 to about 2.0,
            y is from about 3.5 to about 6.5, and
            the atomic ratio of A/A+Si in $ASi_xO_y$ is from about 0.2 to about 0.7; and
    a core layer, the core layer having an index of refraction, $n_1$, wherein $n_1$ is greater than $n_2$ and $n_3$, and $n_2$ is greater than $n_3$.

2. The waveguide according to claim 1, wherein $n_2$ is from about 1.4 to about 2.1.

3. The waveguide according to claim 1, wherein A is Ta.

4. The waveguide according to claim 1, wherein the atomic ratio of A/A+Si in $ASi_xO_y$ is from about 0.25 to about 0.65.

5. The waveguide according to claim 1, wherein the atomic ratio of A/A+Si in $ASi_xO_y$ is from about 0.25 to about 0.5.

6. The waveguide according to claim 1, wherein the assist layer is positioned between the first cladding layer and the core layer.

7. The waveguide according to claim 1 further comprising a second cladding layer.

8. The waveguide according to claim 7, wherein the second cladding layer is positioned adjacent the core layer opposite the assist layer.

9. The waveguide according to claim 1, wherein the assist layer comprises $TaSi_2O_y$.

10. The waveguide according to claim 1, wherein $n_2$ is from about 1.4 to about 1.9.

11. A head comprising:
a light source; and
a waveguide, the waveguide comprising:
   a first cladding layer, the first cladding layer having an index of refraction, $n_3$;
   an assist layer, the assist layer having an index of refraction, $n_2$, and
      the assist layer comprising $ASi_xO_y$,
         wherein A is selected from: Ta, Ti, Nb, Hf, Zr, and Y,
         x is from about 0.5 to about 2.0,
         y is from about 3.5 to about 6.5, and
         the atomic ratio of A/A+Si in $ASi_xO_y$ is from about 0.2 to about 0.7; and
   a core layer, the core layer having an index of refraction, $n_1$,
   wherein $n_1$ is greater than $n_2$ and $n_3$, and $n_2$ is greater than $n_3$;
wherein the light source and the waveguide are configured so that light from the light source is directed into the waveguide.

12. The head according to claim 1, wherein the light source is selected from a laser diode, a light emitting diode (LED), an edge emitting laser diode (EEL), a vertical cavity surface-emitting laser (VCSEL), or a surface emitting diode.

13. The head according to claim 11, wherein the assist layer is positioned between the first cladding layer and the core layer.

14. The head according to claim 11, wherein A is Ta.

15. The head according to claim 11, wherein the atomic ratio of A/A+Si in $ASi_xO_y$ is from about 0.25 to about 0.65.

16. The head according to claim 11, wherein the atomic ratio of A/A+Si in $ASi_xO_y$ is from about 0.25 to about 0.5.

17. The head according to claim 11, wherein the assist layer comprises $TaSi_2O_y$.

18. The head according to claim 11 further comprising a second cladding layer positioned adjacent the core layer on the side opposite the assist layer.

19. A disc drive comprising;
at least one actuator arm having an arm with a first and second end;
at least one head, wherein each arm has a head at the first end thereof and wherein each head comprises:
   a light source; and
   a waveguide, the waveguide comprising:
      a first cladding layer, the first cladding layer having an index of refraction, $n_3$;
      an assist layer, the assist layer having an index of refraction, $n_2$, and
         the assist layer comprising $ASi_xO_y$,
            wherein A is selected from: Ta, Ti, Nb, Hf, Zr, and Y,
            x is from about 0.5 to about 2.0,
            y is from about 3.5 to about 6.5, and
            the atomic ratio of A/A+Si in $ASi_xO_y$ is from about 0.2 to about 0.7; and
      a core layer, the core layer having an index of refraction, $n_1$,
      wherein $n_1$ is greater than $n_2$ and $n_3$, and $n_2$ is greater than $n_3$;
   a magnetic reader; and
   a magnetic writer.

20. The disc drive according to claim 19, wherein A is Ta.

* * * * *